Nov. 2, 1965  G. H. SCHIRMER  3,215,338
ROTISSERIE GRILLING CONTAINER
Filed April 5, 1963  2 Sheets-Sheet 2
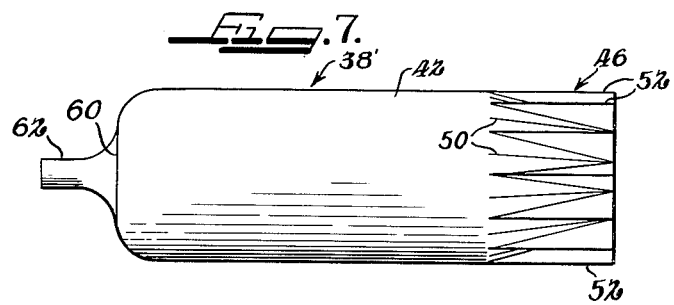
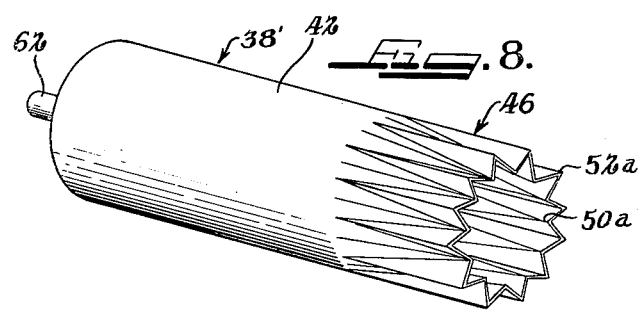
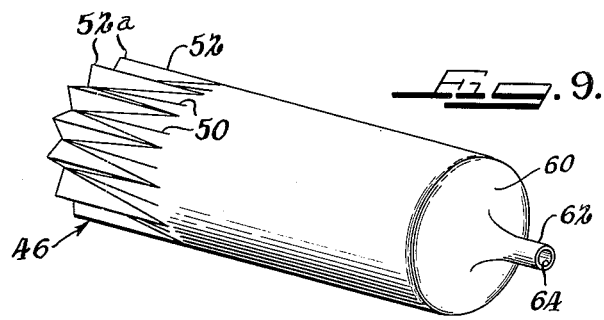
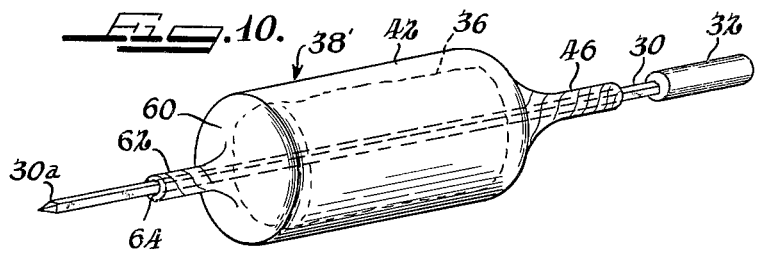
INVENTOR.
GEORGE H. SCHIRMER

United States Patent Office 3,215,338
Patented Nov. 2, 1965

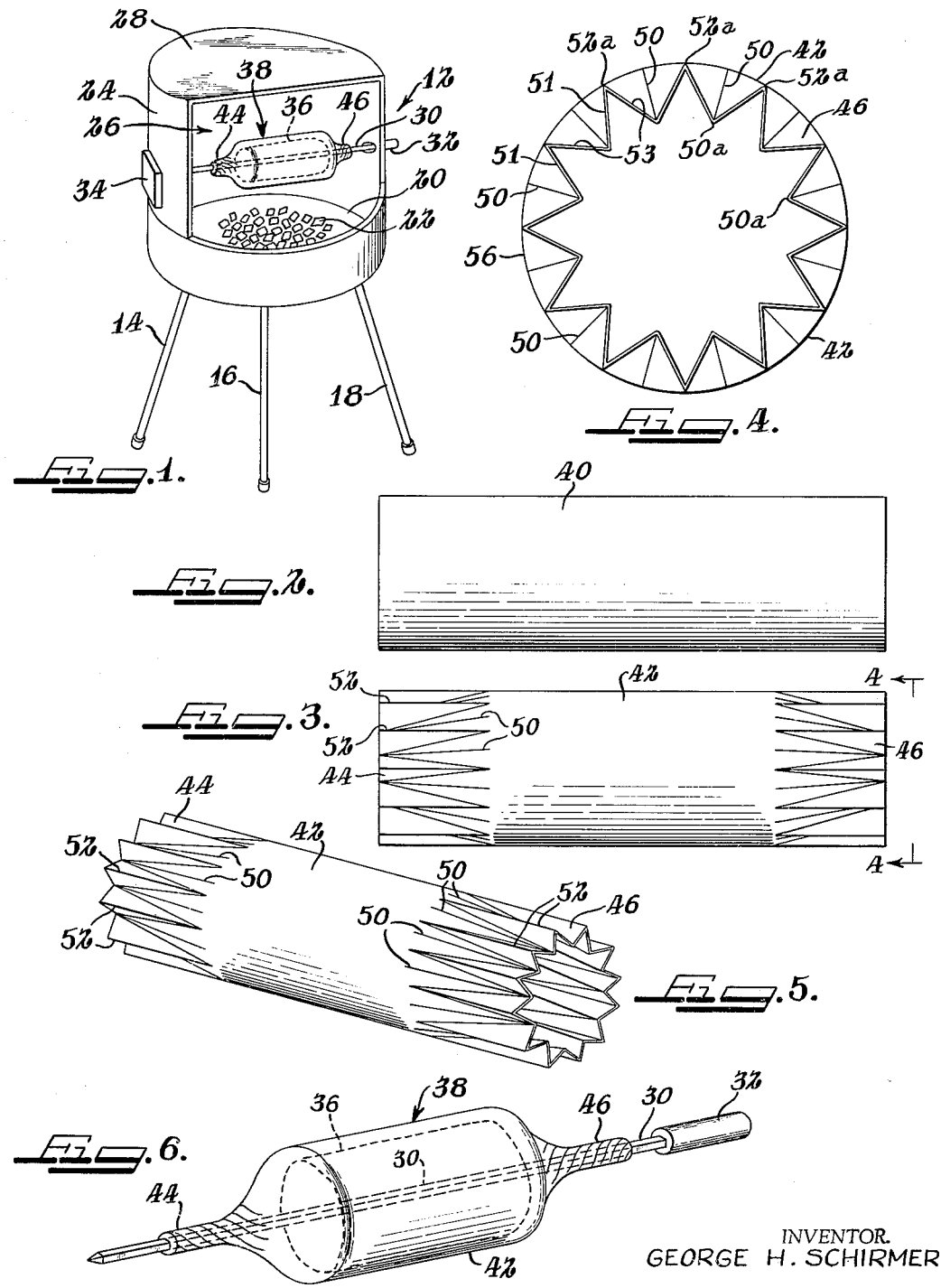

3,215,338
ROTISSERIE GRILLING CONTAINER
George H. Schirmer, 717 S. Park Blvd., Freeport, Ill.
Filed Apr. 5, 1963, Ser. No. 270,973
5 Claims. (Cl. 229—87)

This invention relates to cooking and more particularly to new and improved methods and means for grilling meats on rotisseries.

Heretofore, difficulty had been encountered in the art of rotisserie grilling of meat products in that the natural juices of the meat skewered on the rotisserie spit rod would fall into the cooking coals or charcoal and cause undesirable and unsightly smoke. This smoke not only impairs the vision of the person cooking but also causes eye irritation and smoke inhalation which result in discomfort to the person cooking and those other persons in the immediate vicinity.

Because the major quantity of natural juices of the meat fall into the coals or charcoal, the chef must baste the meat periodically with basting material, such as butter, provided from a separate source of basting material, and under such smoke producing conditions which add still further to the discomfort of the chef.

In addition, since the major quantity of the natural juices of the meat fall into the coal or charcoal, these juices cannot be used to make gravies, and, thus, gravies must be made from an independent source of ingredients.

The above mentioned problems and difficulties, among others, are substantially overcome with the present invention by the provision of a pre-formed sleeve of non-flammable and heat transferable material which surrounds the meat or poultry skewered on the spit rod with at least one end thereof twisted on the spit rod, whereby the sleeve prevents the natural juices of the meat or poultry from falling on the coals and charcoal to reduce the smoke produced in cooking the meat or poultry, the juices of the cooking meat or poultry are collected in the sleeve and may be removed from the sleeve for making gravies therefrom, and the natural juices continuously baste the meat or poultry while the spit rod is rotated.

It is, therefore, an object of the present invention to provide new and improved means for cooking meats or poultry on a rotatable spit rod of an indoor or outdoor rotisserie unit.

Another object of the present invention is to provide a new and improved container for cooking meats on a rotatable spit rod of an indoor or outdoor rotisserie grill unit.

Still another object of the present invention is to provide a fluted end container or package of foil material, such as aluminum foil, surrounding meat or fowl carried by the spit rod of a rotisserie grill unit, with the ends of the package twisted about the spit rod to seal in the juices of the meat or fowl.

A further object of the present invention is to provide a pre-formed package or container constructed of non-flammable foil for surrounding a meat or poultry product on a rotatable spit rod of a rotisserie grill unit with at least one end of the package or container twisted about the spit rod whereby the natural juices of the meat or fowl are prevented from falling on the coals or charcoal employed to cook the meat to thereby prevent these juices from producing smoke, these juices are collected in the package or container during cooking and are available for use in gravies and the like, and these juices continuously baste the meat or poultry while the spit rod rotates during cooking of the meat or poultry.

Yet another object of the present invention is to provide new and improved methods for cooking meat or poultry skewered on a rotatable spit rod of a rotisserie grill unit.

These and other objects, features, and advantages of the present invention will become readily understood from a careful consideration of the following detailed description, when considered in conjunction with the accompanying drawings illustrating various embodiments of the present invention, wherein like reference numerals and characters refer to like and corresponding parts throughout the several views, and wherein:

FIG. 1 is a view in elevation illustrating an embodiment of the present invention in use in connection with an outdoor grill device;

FIG. 2 is a side view in elevation of one form of an embodiment of the present invention;

FIG. 3 is a side view in elevation of a preferred form of another embodiment of the present invention;

FIG. 4 is an end view in elevation taken along line 4—4 of FIG. 3;

FIG. 5 is a perspective view of the embodiment of FIG. 3;

FIG. 6 is a view in elevation of the embodiment of FIG. 3 sealed to a rotisserie spit rod;

FIG. 7 is a side view in elevation of still another form of embodiment of the present invention;

FIG. 8 is a view in perspective illustrating the fluted end of the embodiment of FIG. 7;

FIG. 9 is a view in perspective illustrating the opposite end of the embodiment of FIG. 7, and FIG. 10 is a perspective view illustrating the embodiment of FIG. 7 sealed to a rotisserie spit rod.

Referring to FIG. 1, there is shown a conventional outdoor grill, generally indicated by the numeral 12 which includes three legs 14, 16 and 18 which support a circular base 20 on which rests the cooking coals or charcoal, such as briquettes 22. The base 20 carries a cylindrical sleeve 24 partially open, as indicated at 26 and closed by a semi-cylindrical top 28.

Accessible through the opening 26 and horizontally journalled in the sleeve 24 for rotation is a spit rod 30 which has a handle 32 at one end. The opposite end of the rod 30 is removably connected to the drive means of a motor 34 for rotation thereof.

The rod 30 is illustrated in FIGS. 1 and 6 as inserted through a mass 36, indicated by dotted lines, of meat or poultry (hereinafter referred to as "meat 36").

Surrounding the meat in spaced relation thereto is a pre-formed sleeve, container, package or wrapping 38 constructed of no-flammable and heat-transferable material. This materal preferably is aluminum foil, but it will be appreciated the materials may be any other material having the requisite physical and chemical characteristics necessary to permit its use for cooking purposes.

The sleeve 38 is preferably pre-formed, cylindrical and seamless, when viewed in cross section.

The sleeve 38 may be a cylinder 40, as shown in FIG. 1, or preferably, as shown in FIG. 3, a cylindrical hollow body portion 42 having both ends 44 and 46 open and fluted, as clearly appears in FIG. 4, to facilitate twisting of the ends 44 and 46 about the rod 30 to prevent escape of the natural juices of the meat 36 from the interior of the container 38 along the rod 30.

The fluting of the end portions 44 and 46 of the sleeve 42 is produced by creasing of these ends longitudinally and inwardly to the outer edges of the container along lines 50 where these lines converge and longitudinally along lines 52. In this embodiment of FIGS. 3 and 4, the apex 52a of each crease line 52 defined by adjacent legs 51 and 53 in cross section and is coplanar with the periphery 56 (FIG. 4) of the sleeve body portion 42.

The apex 50a of each crease 50 is located inwardly of the periphery of the sleeve cylindrical body portion 42. It will be appreciated that the ends 44 and 46 are open to an extent sufficient to permit the insertion of the meat 36 into the hollow body portion 42 of the foil container 38.

In use, the rod 30 is passed through the meat 36. The meat 36 and rod 30 are then inserted into the container 38 and the meat 36 is disposed in the body portion 42. It will be appreciated that the diameter of the container body portion 42 is of greater dimension than the cross-sectional dimension of the meat so that the natural juices of the meat may collect in the space between the meat and inner surface of the body portion 42 of the container 38. The configuration of the folds or flutes defined by legs 51 and 53 of the ends 44 and 46 facilitate twisting thereof on the rod 30. When the meat is disposed in the body portion, the fluted or creased end 46 of the container 38 is twisted about the rod 30 in one such direction, such as clockwise, whereby the flutes of this end tend to overlap each other (FIG. 6) to prevent the natural juices of the meat from escaping from the interior of the container 38 along the rod 30. The opposite fluted or creased end 44 of the container is twisted about the rod 30 in a direction opposite the direction of twisting of the end 46, such as counterclockwise, to secure the container in a fixed position on the rod 30 and to prevent escape of the natural juices of the meat from the interior of the container 38 adjacent the end 44 of the container.

The now contained meat is positioned in the rotisserie grill unit 12 of FIG. 1 and the motor 34 energized to cause rotation of the rod 30. The hot coals or charcoal 22 cause cooking of the meat 36. The natural juices of the meat are prevented from escaping from the interior of the container 38 and, as the rod 30 rotates, these juices continuously baste the meat. At a pre-selected time, the motor 34 may be de-energized to terminate rotation of the rod 30. The natural juices then collect in the bottom of the container 38. A pan (not shown) may then be located beneath the container 38 and the bottom of the foil container slit open whereby the natural juices flow into the pan for use in preparing gravies. The container 38 may then be removed from the meat and the motor energized to cause rotation of the rod and to brown the meat.

Thus, it will be appreciated that the container 38 on the rod 30 minimizes the production of smoke caused by dripping juices of the meat and the meat is continuously basted while the meat rotates, and the juices of the meat are readily available for use in making gravies.

In the embodiment of the present invention appearing in FIGS. 7–10, the fluted end 46 of the embodiment of FIGS. 3–6 is retained whereas the end 44 is replaced by a foil end wall 60 having an axial cylindrical projection 62 which has a bore 64. The rod 30 carrying the meat 36 is inserted into the container 38' through the open fluted end 46 of the container.

The end 30a of the rod is passed through the bore 64 of the container as shown in FIG. 10. The end 46 of the container is then twisted on the rod 30 to hold the container 38' on the rod 30 and the end wall 60 is also twisted in a direction opposite to the direction of twisting of the end 46 to fixedly secure the container 38' to the rod 30. The cooking method above described in connection with the embodiment of FIGS. 3–6 is then followed. It will be appreciated also that the container 38' may be flattened and a plurality of flattened sleeves packaged for sale as a unit. The user of the sleeve would then form the substantially cylindrical shape of the container 38', for example, as shown in FIGS. 7, 8 and 9, by hand.

Although various minor modifications of the present invention will become readily apparent to those versed in the art, it should be understood that what is intended to be covered by the patent warranted hereon are all such embodiments as reasonably and properly fall within the contribution to the art hereby made.

I claim:
1. A pre-formed, metal foil, grilling container for containing meat which is skewered on a rotatable split rod, said container having a hollow body portion for receiving the skewered meat, at least one open end portion of a cross-sectional dimension sufficient to permit insertion of the skewered meat therethrough into the interior of said body portion, and an opposite end portion having an axial cylindrical projection with a bore for the insertion of one end of the rod therethrough from the interior of the container, said end portions of the container being constructed for twisting thereof about said rod to secure the container to the rod and to prevent escape of juices of the meat from the container along the rod.

2. The container of claim 1 wherein said one open end portion is fluted to facilitate twisting thereof about said rod to seal the interior of the container.

3. The container of claim 2 wherein said container is constructed of aluminum foil, is substantially cylindrical and seamless in cross-section.

4. The container of claim 1 wherein said opposite end portion includes a transverse end wall carrying said axial cylindrical projection.

5. The container of claim 4 wherein said projection is twistable about said rod to prevent juices of said skewered meat from escaping the container along the rod.

References Cited by the Examiner

UNITED STATES PATENTS

| | | |
|---|---|---|
| 1,058,682 | 4/13 | Atkinson. |
| 2,027,791 | 1/36 | Schrager. |
| 2,105,368 | 1/38 | Parsons. |
| 2,126,116 | 8/38 | Kasdorf. |
| 2,224,504 | 12/40 | Milmore. |
| 3,042,532 | 7/62 | Daline _____ 99—1 X |

OTHER REFERENCES

Soyer's: "Paper-Bag Cookery," 1911, published by Sturgis & Walton Co., New York, pp. 20, 21, 40, 41, 42, and 45.

A. LOUIS MONACELL, *Primary Examiner.*

HYMAN LORD, *Examiner.*